United States Patent Office 3,040,102
Patented June 19, 1962

3,040,102
OXIDATION OF ALKYLBENZENES
Gilbert B. Luzader, South Charleston, W. Va., assignor to Union Carbide Corporation, a corporation of New York
No Drawing. Filed Dec. 18, 1959, Ser. No. 860,346
6 Claims. (Cl. 260—592)

This invention relates to the liquid-phase catalytic oxidation of alkyl substituted aromatic hydrocarbons. More particularly, this invention is directed to the liquid phase catalytic oxidation of alkylbenzenes to produce aryl alkyl ketones and aryl alkyl carbinols at elevated temperatures in the presence of catalytic amounts of pyridine and alkyl substituted pyridines.

It is known that products formed by the oxidation of alkylbenzenes are aryl alkyl ketones and aryl alkyl carbinols using various metal catalysts. For instance, in the oxidation of ethylbenzene, the principal products obtained are acetophenone, methyl phenyl carbinol, benzoic acid and organic residues. Of these products, acetophenone and methyl phenyl carbinol are of greater value than benzoic acid and it is desirable to use a process wherein the acetophenone and methyl phenyl carbinol are predominantly produced while producing, at most, only a small quantity of other products such as benzoic acid and organic residues. The known methods for the catalytic oxidation of ethylbenzene, use metallic catalysts which are generally insoluble in the reaction medium. The insoluble catalysts after a period of time, form sludges and deposits which tend to accumulate and plug the reactor used.

It is an object of this invention to provide a liquid-phase catalytic oxidation process for alkylbenzenes wherein aryl alkyl ketones and aryl alkyl carbinols are predominantly produced while producing, at most, only a small quantity of other products such as aryl alkyl acids and organic residues. Another object of this invention is to provide a liquid phase catalytic oxidation process for alkylbenzenes containing a catalyst system soluble within the reaction medium. A further object of this invention is the predominant production of acetophenone and methyl phenyl carbinol by the oxidation of ethylbenzene while producing, at most, only a small quantity of other materials such as benzoic acid and organic residues. These and other objects will readily become apparent to those skilled in the art in the light of the teachings herein set forth.

It has been discovered that aryl alkyl ketones and aryl alkyl carbinols can be predominantly produced by the reaction of alkylbenzenes containing at least one alkyl group of more than one carbon atom and oxygen in the presence of catalytic amounts of compounds characterized by the general formula:

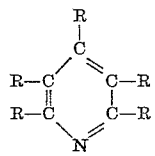

wherein each R, individually, represents members selected from the group consisting of hydrogen and alkyl radicals.

The process of this invention may be carried out in either batch or continuous types of operation although the latter is generally preferred. The hydrocarbon to be oxidized and the catalyst are brought together either in the form of a mixture or separately into a reaction vessel having a device for introducing oxygen as gases containing oxygen such as air into the vessel, preferably by passing the gas bubbles through the liquid. After the oxidation has progressed to the desired point, the resulting products are removed from the reactor system and isolated by fractional distillation.

The hydrocarbons suitable for oxidation in this invention are the mono-alkyl and di- and poly-alkylbenzenes. The preferred alkylbenzenes to be oxidized in this invention are the alkyl substituted benzenes containing two or more carbon atoms in the side chain. In the oxidation of the alkylbenzenes, the oxygen shows a specific affinity for the carbon atom attached to the benzene nucleus in the alpha position and attacks this carbon atom first, forming mixtures of carbinols and ketones. The product of oxidation, for example, in the case of ethyl benzene is a mixture of acetophenone and methyl phenyl carbinol. In an analogous way, oxidation takes place in the higher normal homologues of ethyl benzene such as n-propyl benzene, n-butyl benzene, n-hexyl benzene and the like. The homologues with a branched side chain such as isopropyl benzene partly lose one methyl group by oxidation. Besides the corresponding carbinol, a ketone with one carbon atom less in the side chain is formed. Thus, in the case of isopropyl benzene, dimethyl phenyl carbinol and acetophenone are formed. Alkylbenzenes containing more than one normal or secondary alkyl group may give rise to mixtures of products by oxidation of the different alkyl groups; the number of such products is, however, small since it is found that oxidation seldom or never takes place at more than one alkyl group in any particular molecule. Examples of hydrocarbons that can be oxidized in accordance with this invention are ethyl benzene, n-propyl benzene, isopropyl benzene, n-butyl benzene, n-amyl benzene, n-hexyl benzene, n-octyl benzene, 1,2-diethylbenzene, 1,3-diethylbenzene, 1-ethyl 4-isopropyl benzene and the like.

The oxidation process is carried out at a temperature above 100° C. preferably in the range of 100° C. to 150° C. depending upon the nature of the alkylbenzene charged to the process which is effected at a pressure of from substantially atmospheric to about 100 pounds per square inch, gauge. For convenience in operation, the process is preferably carried out at pressures of from about atmospheric to about 50 pounds per square inch, gauge. Oxygen is used as such or the oxidation is effected by means of air or a mixture of oxygen and an inert gas.

To obtain the best yields of aryl alkyl ketones and aryl alkyl carbinols it is desirable to stop the oxidation while at least half the starting material remains unoxidized and preferably while 75 percent or even more remains unoxidized. In general it is sufficient to allow the oxidation to proceed for about 5 minutes to 180 minutes, preferably for about 15 to 60 minutes, depending on the particular starting material and the other reaction conditions. The unoxidized material is readily recovered by fractional distillation and may be again employed in the process of the invention.

It has been discovered that the oxidation reaction of the alkylbenzene in this invention is promoted by the presence of catalytic amounts of pyridenes and alkyl substituted pyridines corresponding to the general formula:

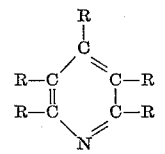

wherein each R, individually, represents members selected from the group consisting of hydrogen and alkyl radicals containing from 1 to 18 carbon atoms. Examples of the pyridine derivatives which can be used in this process include for example: pyridine, 2-methylpyridine, 3- methylpyridine, 4-methylpyridine, 2,4-dimethylpyridine, 2,6-dimethylpyridine, 2,4,6-trimethylpyridine, 2,4,5-trimethylpyridine, 2,3,4,5-tetramethylpyridine, 2-methyl-5-ethylpyridine, diethylpyridines, butylpyridines, octlpyridines and the like.

The concentration of catalyst used in this process can range from 0.5 to 5.0 percent by weight of the alkylbenzene feed. Concentrations as low as 0.25 percent and higher than 5.0 percent by weight of the alkylbenzene can be used however, amounts less than the preferred range result in a decrease in the rate of oxidation and greater amounts are unnecessary since they do not materially affect the rate of oxidation.

The use of pyridine and alkyl substituted pyridines is highly advantageous in this process because of their excellent stability and excellent solubility properties. The pyridine compounds are sufficiently stable so that they are unaffected in the oxidation of the alkylbenzenes yet promote the oxidation without the use of initiators and are readily recoverable by the fractional distillation of the resulting products. The recovered pyridines can be reused in the oxidation process. On the other hand, the known insoluble metal catalyst used in the oxidation of alkylbenzenes requires initiators of the reaction such as dibenzoyl peroxide and are used in the forms of slurries which tend to form sludges and metallic deposits in the reactor causing heat exchange and emulsion problems. The use of insoluble catalysts also requires periodic cleaning of the reactor system and presents recovery and purification problems which are time consuming and wasteful. Due to the excellent solubility of pyridines in organic compounds, especially alkylbenzenes, the soluble catalyst system of this invention eliminates heat exchange and emulsion problems and are readily recoverable for reuse in good yields by fraction distillation.

The following examples will serve to illustrate the practice of the invention:

Example 1

A two-stage pot-type glass converter was provided in each stage with an agitator, thermometer, electric heating mantle, air feed diffuser in the bottom, ¼ x ¼ inch stainless-steel perforated saddles as bottom packing and a brine-cooled decanting head for removal of water and blow off gas. The flow of gas through the reactor was maintained by means of an air stream at a constant pressure.

To the reactor 250 grams per hour of ethylbenzene and 2.5 grams per hour 2-methyl pyridine were charged. The reactor was maintained at 125° C. and atmospheric pressure. Air was provided at the rate of 4 to 7 cubic feet per hour. The ethylbenzene and air were fed at such a rate to maintain a conversion of 25 percent of the feed to methyl phenyl carbinol and acetophenone. After 4 hours of operation, steady conditions were attained and the following results were obtained in a 26 hour operation.

|  | Percent |
|---|---|
| Percent by weight of 2-methyl pyridine in ethylbenzene feed | 1.1 |
| Percent by weight of ethylbenzene (of total oxidized) converted to— | |
| Acetophenone | 76.3 |
| Methyl phenyl carbinol | 9.8 |
| Benzoic acid | 3.5 |
| Residues | 7.8 |

Ninety percent of the 2-methyl pyridine was recovered with the unreacted ethylbenzene.

Example 2

Using the procedure identical to that of the preceding example except 350 grams per hour of ethylbenzene and 7.3 grams per hour 2-methyl-5-ethyl pyridine were charged to the reactor. The following results were obtained:

|  | Percent |
|---|---|
| Percent by weight of 2-methyl-5-ethyl pyridine in ethylbenzene feed | 2.1 |
| Percent by weight of ethylbenzene (of total oxidized) converted to— | |
| Acetophenone | 81.8 |
| Methyl phenyl carbinol | 8.7 |
| Benzoic acid | 3.3 |
| Organic residues | 5.0 |

Eighty-five percent of the 2-methyl-5-ethyl pyridine was recovered by fractional distillation.

Although the above examples relate to the oxidation of ethylbenzene to give acetophenone with methyl phenyl carbinol, other alkylbenzenes may be oxidized to the corresponding ketones and carbinols under similar conditions. For example n-propyl benzene may be oxidized to ethyl phenyl ketone and ethyl phenyl carbinol; isopropyl benzene may be oxidized to acetophenone and methyl phenyl carbinol. Alkylbenzenes in which no hydrogen atom is attached to the alkyl carbon atom adjacent to the aromatic ring appear not to be oxidized to ketones and carbinols under the conditions of this invention.

What is claimed is:

1. A process for the preparation of aryl alkyl ketones and aryl alkyl carbinols consisting essentially of heating in the liquid phase above 100° C. alkylbenzenes containing at least one alkyl group of more than one carbon atom and oxygen in the presence of the compound having the formula:

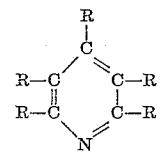

wherein each R, individually, represents members selected from the group consisting of hydrogen and alkyl radicals.

2. The process of claim 1 wherein the temperature ranges from about 100° C. to about 150° C.

3. A process for the preparation of acetophenone and methyl phenyl carbinol consisting essentially of heating in the liquid phase to above 100° C., ethyl benzene and oxygen in the presence of the compound having the formula:

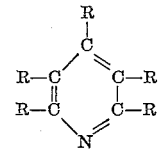

wherein each R, individually, represents members selected from the group consisting of hydrogen and alkyl groups.

4. The process of claim 3 wherein the temperature ranges from about 100° C. to about 150° C.

5. A process for the preparation of acetophenone and methyl phenyl carbinol consisting essentially of heating in the liquid phase from 100° C. to 150° C., ethylbenzene and oxygen in the presence of 2-methyl pyridine.

6. A process for the preparation of acetophenone and methyl phenyl carbinol consisting essentially of heating in the liquid phase to 100° C. to 150° C., ethylbenzene and oxygen in the presence of 2-methyl-5-ethyl pyridine.

References Cited in the file of this patent

UNITED STATES PATENTS

| 1,813,606 | Binapfl et al. | July 7, 1931 |
| 2,734,086 | Goppel et al. | Feb. 7, 1956 |